United States Patent
Van de Sluis et al.

(10) Patent No.: US 7,920,931 B2
(45) Date of Patent: Apr. 5, 2011

(54) RECORDING AND PLAYBACK OF VIDEO CLIPS BASED ON AUDIO SELECTIONS

(75) Inventors: Bartel Marinus Van de Sluis, Eindhoven (NL); Koen Hendrik Johan Vrieling, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 923 days.

(21) Appl. No.: 11/719,664

(22) PCT Filed: Nov. 21, 2005

(86) PCT No.: PCT/IB2005/053841
§ 371 (c)(1),
(2), (4) Date: May 18, 2007

(87) PCT Pub. No.: WO2006/056933
PCT Pub. Date: Jun. 1, 2006

(65) Prior Publication Data
US 2009/0177299 A1 Jul. 9, 2009

Related U.S. Application Data

(60) Provisional application No. 60/630,689, filed on Nov. 24, 2004.

(51) Int. Cl.
*G06F 17/00* (2006.01)
(52) U.S. Cl. .......................................... 700/94; 715/201
(58) Field of Classification Search .................... 700/94
See application file for complete search history.

(56) References Cited

U.S. PATENT DOCUMENTS

| | | | |
|---|---|---|---|
| 7,000,242 B1 * | 2/2006 | Haber | 725/43 |
| 7,113,983 B1 * | 9/2006 | Terada et al. | 709/219 |
| 7,251,665 B1 * | 7/2007 | Dunning et al. | 1/1 |
| 2003/0072562 A1 | 4/2003 | Vau et al. | |
| 2003/0233929 A1 | 12/2003 | Agnihotri | |
| 2004/0267715 A1 * | 12/2004 | Polson et al. | 707/3 |

FOREIGN PATENT DOCUMENTS
WO 02102079 A1 12/2002

* cited by examiner

Primary Examiner — Walter F Briney, III

(57) ABSTRACT

Video clips (160) are selected for viewing or recording in a video system (160) based on songs that are selected for play in an audio system (110). A history (120) of audio selections is maintained, and based on this history (120), the system identifies 'favorite' songs. The system searches sources of video material for video clips (160) that are related to the favorite songs, and records the clips (160). When a favorite song is subsequently selected for play (410), the video system is configured to also play (440), or offer to play (430), the corresponding video clip (160). Optionally, the system is configured to store (390) the location of previously recorded video clips, such as the location of the clip in a user's video collection, or the URL of the clip in a computer network, such as the Internet.

6 Claims, 3 Drawing Sheets

RECORDING AND PLAYBACK OF VIDEO CLIPS BASED ON AUDIO SELECTIONS

This invention relates to the field of entertainment systems, and in particular to a multi-media system wherein video clips are recorded and played back based on a selection of audio material.

Most home entertainment systems include an audio system and a video system, or a combined audio-video system. Generally, the audio system allows a "jukebox"-like function, wherein the user can select particular songs to play, or allow the system to select songs to play, using any of a variety of criteria. For example, the selection may be purely random, or it may be based on genre, style, artist, etc. A conventional video system typically includes a recording capability, either to tape (VCR), magnetic disk (DVR), optical disk (DVD-R/W), and so on.

Systems are commonly available for automating the selection of material for presentation to a user, or for recording the material for future presentation to a user. These automated systems generally allow the user to explicitly state preferences or non-preferences (e.g. "comedy", "news", not "sports", etc.) to facilitate the selection process. Some systems are also configured to further modify the preferences or non-preferences based on a user's viewing or listening history.

In conventional systems that provide selections for presentation or recording based on a user's history, the selection is uni-dimensional. That is, the selection of material for viewing is based on a user's viewing history, and the selection of material for listening is based on a user's listening history.

It is an object of this invention to integrate the functionality provided by audio systems with the functionality provided by video systems. It is a further object of this invention to identify material for recording in one media based on selections of material in another media.

These objects, and others, are achieved by a method and system wherein video clips are selected for viewing or recording in a video system based on songs that are selected for play in an audio system. A history of audio selections is maintained, and based on this history, the system identifies 'favorite' songs. The system searches sources of video material for video clips that are related to the favorite songs, and records the clips. When a favorite song is subsequently selected for play, the video system is configured to also play, or offer to play, the corresponding video clip. Optionally, the system is configured to store the location of previously recorded video clips, such as the location of the clip in a user's video collection, or the URL of the clip in a computer network, such as the Internet.

The invention is explained in further detail, and by way of example, with reference to the accompanying drawings wherein.

Figure 4:
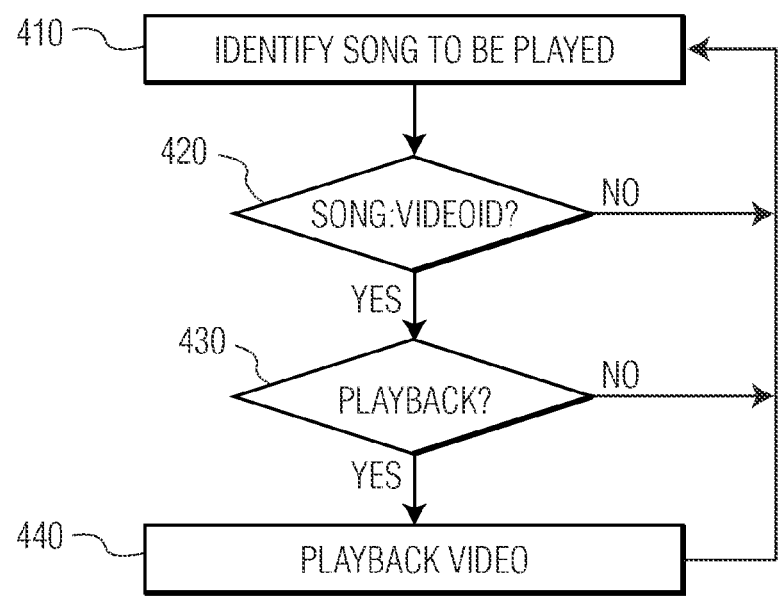

FIG. 4 illustrates an example flow diagram for rendering video clips based on songs being rendered by an audio system in accordance with this invention Throughout the drawings, the same reference numeral refers to the same element, or an element that performs substantially the same function. The drawings are included for illustrative purposes and are not intended to limit the scope of the invention.

Figure 1:
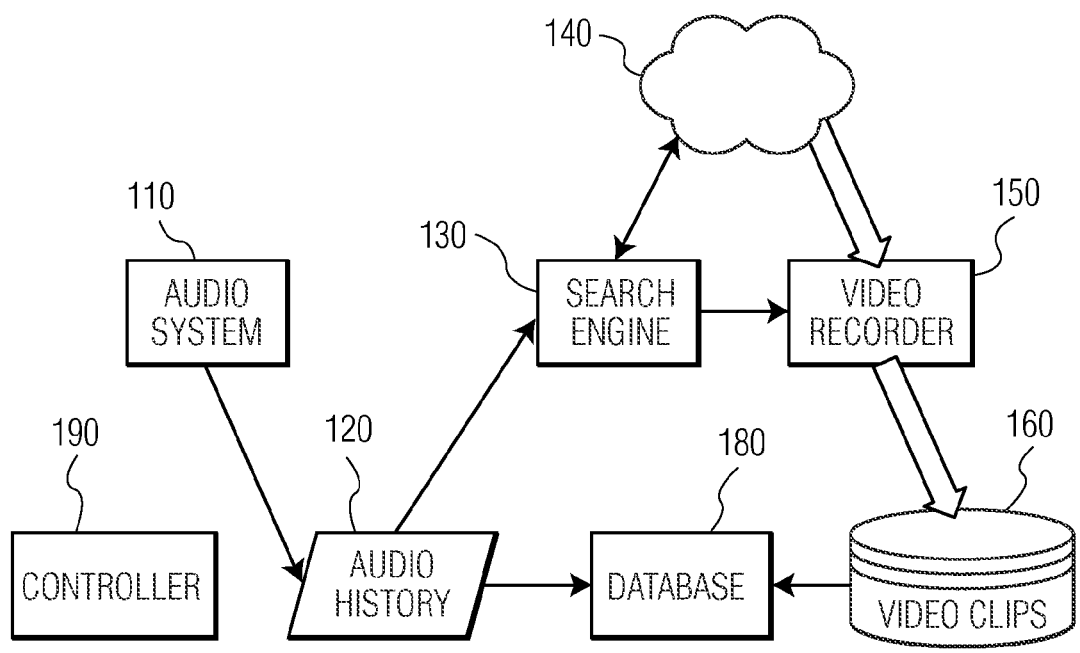
FIG. 1 illustrates an example block diagram of a system of this invention that records video clips based on rendered audio material.

FIG. 1 illustrates an example block diagram of a system of this invention that records video clips based on rendered audio material. The system includes a controller 190 that is configured to search a network 140 for video material, based on selections played by an audio system 110. When video material corresponding to an audio selection is found, the controller enters the correspondence in a database 180, and optionally controls a video recorder 150 to record this material.

The search engine 130 is configured to one or more networks 140 for video material that is related to selections played by the audio system 110. The network 140 may include, for example, broadcast, satellite, or cable television transmissions, Internet sites, and other sources of video material. For the purposes of this disclosure, video material includes both still and motion images, and is hereinafter referred to as "clips".

Although the system may be configured to search for video material corresponding to a selection currently being played on the audio system, the likelihood of a cotemporaneous broadcast of video that corresponds to the currently selected song is slight, and therefore, in a preferred embodiment, the search is conducted based on a history 120 of audio selections. For ease of understanding, the invention is hereinafter described using the paradigm of an asynchronous relationship between the audio system 110 and the search engine 130, although one of ordinary skill in the art will recognize that the search engine 130 could be controlled based on current activities at the audio system 110, or based on material contained in a queue of material that is scheduled to be played on the audio system 110. In this context, the history 120 corresponds to a history of selections, and includes the currently selected song, as well as sets of songs that have been selected for subsequent play.

As detailed further herein, the system is configured to render one or more video clips corresponding to a current selection at the audio system 110. Using the paradigm of an asynchronous relationship between the audio system 110 and the search engine 130, the video clips found by the search engine 130 are recorded by a video recorder 150 for subsequent playback when the corresponding song is selected at the audio system 110. In the context of a cotemporaneous selection and search, the video clip could be played, rather than recorded. As noted above, to facilitate this rendering, the controller 190 is configured to maintain a database 180 that contains the correspondence between the songs and the found video clips 160.

Note that the video recorder 150 and the storage of video clips 160 are presented herein for ease of understanding. If the video material is already in an accessible recorded form, such as on a DVD in a user's video collection, or stored on a user's computer, or another accessible computer, the system can be configured to merely store an "address" of the video clip, such as a disk and track identifier, a file reference, a URL, and so on, in the database 180. That is, the illustrated video clips 160 need not reside in a single storage device, nor do they need to have been recorded by the recorder 150. In like manner, the recorder 150 may include a variety of components, depending upon the form of the video material. For example, if the video material is a file on an Internet site, the recorder 150 may correspond to a personal computer that records/stores the file to its hard drive, or to a disk in its DVD recorder. If the video material is contained in a broadcast signal, the recorder 150 may correspond to a VCR or DVR that is coupled to a receiver of the signal.

Preferably, the controller 190 is configured to maintain a priority scheme, so as not to interfere with other higher-priority uses of the recorder 150, such as a user's explicit selection of a program to record.

Although the system may be configured to search for video material corresponding to each selection at the audio system 110, recording and/or search resources may be limited. Therefore, in a preferred embodiment of this invention, the controller 190 is configured to search for video material corresponding to songs that are likely to be played. Generally, the likelihood of a song being played can be estimated by its history 120 of having been played in the past, as well as the history 120 of similar songs having been played. Also, if the history 120 includes sets of songs that have been selected for subsequent/future play, then the likelihood of play is also high.

Figure 3:
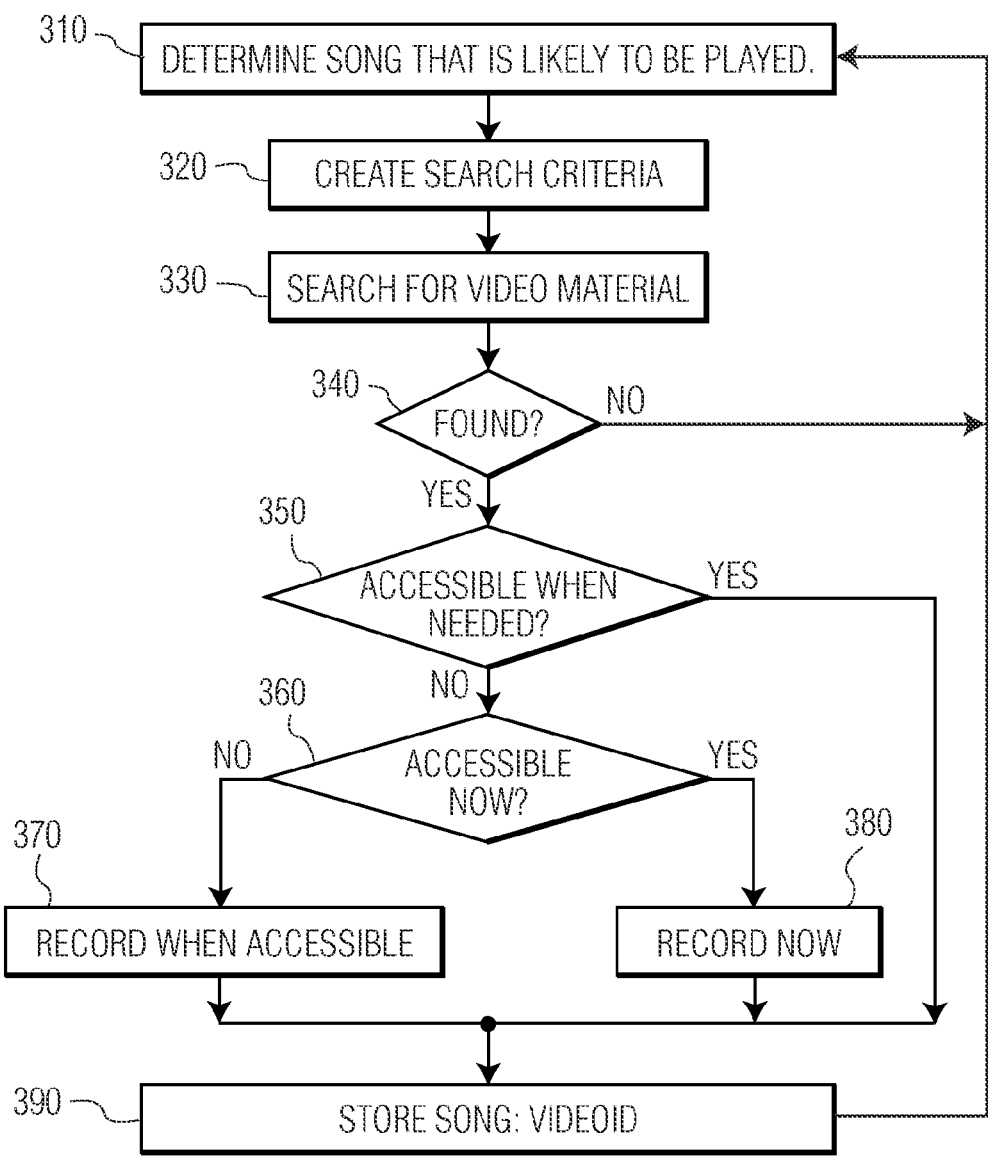
FIG. 3 illustrates an example flow diagram for associating video clips with audio selections in accordance with this invention.

FIG. 3 illustrates an example flow diagram for associating video clips with audio selections, as may be used in the controller 190 of FIG. 1.

At 310, the system determines a song that is likely to be played. As noted above, this may be based on a history of user selections, or based on a list of songs that are scheduled to be played by the audio system. The system may also be configured to determine a class of songs that are likely to be played; that is, if a user typically plays songs of a given artist, the determination at 310 may merely be an identification of the artist. In like manner, the determination at 310 may be an identification of a genre, style, and so on. Techniques for identifying "favorites" based on a usage history are common in the art, and can be used herein to determine either very specific favorites, such as a specific song by a particular artist, or very general favorites, such as a preference for country-western ballad singers on weekend evenings.

At 320, the system determines search criteria corresponding to the determination of the song or class of songs that are likely to be played, and based on the networks available for searching. For example, if a user regularly plays "Madonna" songs, the search engine will be configured to search for "MTV" broadcasts featuring Madonna, news items related to Madonna, web sites that include clips of Madonna performances, and so on.

At 330, the search is conducted, using any of a variety of techniques. For example, the search criteria from 320 may include the meta-data that is recorded with the song or album to identify the title, artist, genre, and so on. This information can be compared to meta-data associated with video broadcasts or recordings, such as the synopsis that is provided for automated television guides, or key words for web-page searching. Optionally, speech-recognition or character-recognition systems can be employed to extract information from the video material. Similarly, the audio content of the video material could be compared to the audio content of the song, using, for example, Fourier analysis or similar techniques.

If, at 340, no video material is found to correspond to the song or class of songs that are likely to be played, the system returns to 310 to determine another song or class of songs, and the process is repeated.

If, at 340, a source of video material is found or identified, a determination is made as to whether the video material is likely to be available when the song might be selected. If, at 350, it is determined that the video material is readily available, such as from a web-site, or from a user's on-line collection of video material, the information required to locate the material when needed is stored, at 390.

If, at 350, it is determined that the video material is not likely to be continuously available, and therefore not likely to be available when it may be needed, the system is configured to record the material. If, at 360, the material is not currently accessible, such as video material that is scheduled to be broadcast at some future time, the system schedules the recorder to record the material at a later time, at 370. Otherwise, the system activates the recorder to record the material now, at 380.

At 390, the information required to locate the material when needed is stored, and the system returns to 310 to determine another song or class of songs that are likely to be played.

In an alternative or supplemental embodiment, the system can be configured to allow a user to directly associate video clips with individual songs or sets of songs. For example, the system may continuously record video material from a music channel, such as MTV, and allow the user to select sub-segments of the recorded material to store as video clips associated with selected songs from the user's audio collection. In like manner, if the user views video information while browsing the Internet, the user can either download a copy to add to the collection of video clips, or store the URL corresponding to the clip on the Internet, and associate the location of this clip with a selected song or set of songs in the user's audio collection via the database.

Figure 2:
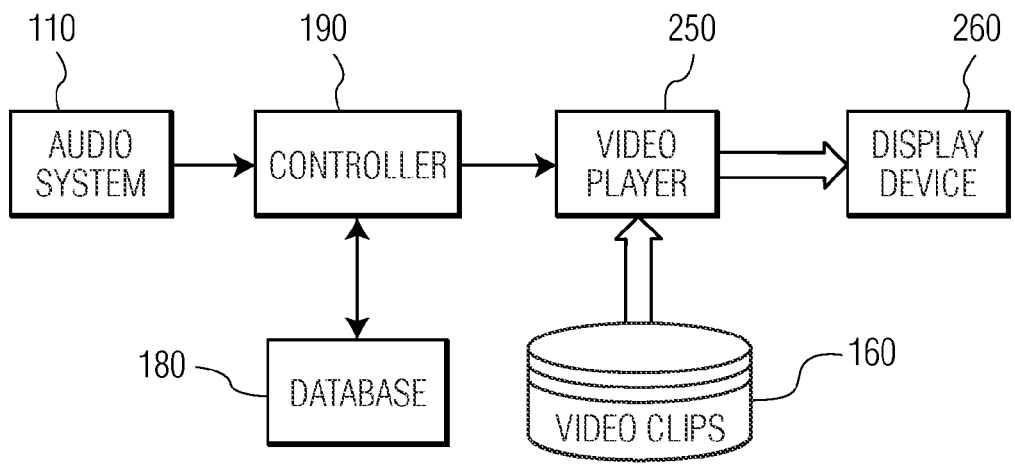
FIG. 2 illustrates an example block diagram of a system of this invention that plays video clips based on selected audio material.

FIG. 2 illustrates an example block diagram of a system of this invention that plays video clips based on selected audio material.

The controller 190 and audio system 110 are illustrated as being the same components as used in FIG. 1, for ease of understanding, although one of ordinary skill in the art will recognize that they need not be the same.

When a song is about to be played, the controller 190 accesses the database 180 to determine whether a video clip 160 has been identified to correspond to this song. If so, the controller 190 is configured to activate a video player 250 to render the clip 160 on a display device 260. Depending upon the media of the clip 160, the video player 250 may be a VCR, VDR, DVD-player, and so on. If the clip 160 is stored in a computer file, the video player 250 may represent a video card on a computer; if the clip 160 is an on-demand broadcast, the video player 250 may represent a cable or satellite interface unit.

In a preferred embodiment, the controller 190 provides a user interface to allow a user to disable or postpone the rendering of the clip 160, as detailed further below. This interface also includes selective activation of the search and/or record modes. For example, the system may be user-configured to only search for video corresponding to the "N" most frequently played songs, or to only search for video corresponding to the "M" most popular performers. In like manner, the user may limit the amount of recording resources used for this automated recording process. Other control and configuration options will be evident to one of ordinary skill in the art in view of this disclosure.

FIG. 4 illustrates an example flow diagram for a user interface that may be embodied in the controller 190 of FIG. 2 for rendering video clips based on the songs being rendered by an audio system in accordance with this invention.

At 410, the selected song that is about to be played, or currently being played, is identified.

At 420, the database containing a song-video correspondence, as discussed above, is searched to determine whether a video clip has been identified to correspond to the selected song. Depending upon the information in the database, this determination may be very specific, such as a match of song title and artist, or more general, such as a determination that the selected song matches a class of songs having an associated video clip. For example, the video clip may be associated with a particular artist, rather than a specific song, or with a particular genre, style, etc. In some cases, the selected song may be associated with a plurality of video clips, and, in a preferred embodiment, the determination at 420 will include a "ranking" of the degree of match between the selected song and each entry in the database.

At 430, the user is given the option of playing back the identified video clip, at 440, and/or selecting from among multiple video clips. Preferably, if multiple clips have been associated with the selected song, the interface is configured to present the selection based on the aforementioned ranking based on the degree of match between the selected song and each entry in the database.

In a preferred embodiment, the user is provided the option of rendering the video clip concurrent with the audio selection, subsequent to the audio selection, in lieu of the audio selection, or not at all. If a concurrent presentation is selected, the user is also provided the option of muting the audio portion of the video track. Optionally, if the same song is contained on the video clip and the audio system, the system may be configured to synchronize the video clip to the rendering of the selected song by the audio system. This option is particularly well suited for implementation in a system wherein the quality of the audio system is superior to the quality of the audio component of the video clip. If a subsequent presentation is selected, or if the video clip is selected in lieu of the audio clip, the system is configured to control the audio system to appropriately cease the rendering of the audio clip while the video clip is being rendered, and to render the next audio selection when the video clip ends.

In a default scenario of a preferred embodiment, the user places the system in a "video clip mode", wherein the system will automatically play back a video clip corresponding to a selected song whenever such a clip is available. Similarly, the system can be configured to automatically provide the video clips on a "video clip channel" on a television or entertainment system, and the user enters the video clip mode by merely selecting the video clip channel when the user activates the audio system.

Also in a preferred embodiment, an indication of the availability of video clips for songs in a user's collection is provided to the user. In a straightforward embodiment of a computer controlled audio system, the interface used to select songs to create a "playlist" is augmented with a check mark or other indicator at each song title. In an alternative embodiment, a "thumbnail" image of each clip is used as the indicator. If multiple clips are available for a given song, the interface also allows the user to select which clip to render when the song is being played. Other user options can be provided as well. For example, the interface may allow the user to select a 'default' clip for a given song, and also allow the user to select an alternative clip, or no clip at all, when the song is placed in the current playlist. In like manner, a default 'background clip' may be identified for rendering when a song in the playlist does not have an associated video clip. Other configuration and selection options will be evident to one of ordinary skill in the art in view of this disclosure.

If, at 420, there is no video associated with the selected song, or, at 430, the user selects not to render the video, or, at 440, when the video clip is rendered, the system returns to 410 to wait for the next selected song, then repeat the above process.

The foregoing merely illustrates the principles of the invention. It will thus be appreciated that those skilled in the art will be able to devise various arrangements which, although not explicitly described or shown herein, embody the principles of the invention and are thus within its spirit and scope. For example, once video material is identified to correspond to a set of user "favorites", as discussed above, the system can be configured to augment the user's collection of audio material by copying segments of the audio track of the identified video material. For example, if a user's favorite artist appears on MTV, the song(s) that the artist performs during the appearance can be recorded to add to the user's collection of audio selections. Also, recognizing that storage capabilities are limited for storing video clips, the flow diagram of FIG. 3 can be modified to include a deletion of previously stored video clips to make room for recording the newly identified video clips at 370, 380. Any of a number of priority schemes, common in the art of caching, can be used to decide which clips to delete, including a straightforward first-in, first-out replacement scheme. These and other system configuration and optimization features will be evident to one of ordinary skill in the art in view of this disclosure, and are included within the scope of the following claims.

In interpreting these claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) each of the disclosed elements may be comprised of hardware portions (e.g., including discrete and integrated electronic circuitry), software portions (e.g., computer programming), and any combination thereof;
 f) hardware portions may be comprised of one or both of analog and digital portions;
 g) any of the disclosed devices or portions thereof may be combined together or separated into further portions unless specifically stated otherwise; and
 h) no specific sequence of acts is intended to be required unless specifically indicated.

The invention claimed is:

1. A system comprising:
 a video player that is configured to render a select video clip to a display device;
 a controller operably coupled to the video player, said controller determining the select video clip based on a selection of a select song at an audio system; and
 a database operably coupled to the controller, said database storing a plurality of associations between song information and video clip information,
 wherein the controller determines the select video clip from the video clip information of the database, based on a comparison of the select song and the song information of the database,
 and wherein the song information includes at least one class of songs, and the class of songs includes at least one of artist and genre.

2. The system as claimed in claim 1, wherein the controller further provides a user interface to facilitate control of the video player.

3. The system as claimed in claim 2, wherein the user interface further facilitates control of the audio system.

4. The system as claimed in claim 3, wherein
the user interface includes indicators of available video clips corresponding to selectable songs at the audio system.

5. The system as claimed in claim 4, wherein
the indicators include thumbnail images corresponding to the available video clips.

6. A method comprising:
identifying a song that is to be played on an audio system;
determining song information of the identified song, said song information including at least one class of songs, and the class of songs including at least one of artist and genre;
searching a database, storing a plurality of associations between song information and video clip information, to determine video clip information corresponding to said song information;
identifying and locating a video clip corresponding to the determined video clip information; and
rendering the video clip on a display device when the song is played on the audio system.

* * * * *